INVENTORS.
EDWARD T. MOORE
THOMAS G. WILSON
BY
ATTORNEY

United States Patent Office 3,281,644
Patented Oct. 25, 1966

3,281,644
INVERTER CIRCUITRY USING CONTROLLED
RECTIFIERS
Edward T. Moore, 190 Withers Road, Wytheville, Va.,
and Thomas G. Wilson, 2721 Sevier St., Durham, N.C.
Filed June 7, 1963, Ser. No. 286,311
12 Claims. (Cl. 321—45)

This invention is concerned with circuitry suitable for converting direct current to alternating current and in particular concerns controlled rectifiers in static inverter circuits.

The invention described herein was made in the performance of work under a NASA contract and is subject to the provisions of the National Aeronautics and Space Act of 1958, Public Law 85–568 (72 Stat. 426; 42 U.S.C. 2451) as amended. This application is a continuation-in-part of patent application S.N. 249,110 "Turn-Off Circuitry for Silicon Controlled Rectifier and Other Thyratron-Like Devices" filed December 31, 1962.

A controlled rectifier is a uni-directional conducting device having anode, cathode, and gate terminals which is at present available in several forms and is widely used as a switching element. The so called silicon controlled rectifier is presently the most widely used type of controlled rectifier, although the term "controlled rectifier" as used throughout the description of this invention and in the claims is intended to encompass not only silicon controlled rectifiers but also grid controlled gaseous thyratron tubes and other thyratron-like switching elements.

Controlled rectifiers will, under certain conditions, readily pass current in the forward direction through the anode-cathode path, but do not normally conduct at any time in the reverse direction. Controlled rectifiers may be rendered conductive in the forward direction by the application of an appropriate electric signal to the gate terminal. After conduction has been initiated, the controlled rectifier will remain in the conducting state until such time as the forward current through the device is reduced below a predetermined value which allows the device to return to its current-blocking condition. The controlled rectifier regains its forward blocking ability most quickly if a reverse voltage is impressed across the anode-cathode terminals during the turn-off interval.

Controlled rectifiers have been used extensively in circuits to convert direct current to alternating current and to convert direct current at one voltage level to direct current at some other level. A variety of different circuits, often referred to as inverters or converters, have been developed for this purpose. In using controlled rectifiers as switches in D.C. applications, one major problem is that of turning off a conducting controlled rectifier at the end of the desired interval of conduction. This is because the conducting controlled rectifier is normally in series with the D.C. source and can be returned to the nonconducting state only by an externally caused interruption of the forward current through the controlled rectifier. Controlled-rectifier inverters therefore must incorporate circuit characteristics which will cause the forward current through the controlled rectifiers to be interrupted periodically.

In most conventional controlled-rectifier inverters it is the turning on of one controlled rectifier by the application of a pulse from a trigger circuit which causes the turning off of the other controlled rectifier. This transference of conduction from one controlled rectifier to the other is commonly referred to as commutation. It is largely in the manner in which this commutation is accomplished that the various inverters differ. Furthermore, most of the problems associated with presently used controlled-rectifier inverters are directly or indirectly related to problems of commutation. For a discussion of representative prior art inverters and of some of the problems involved in their usage, the reader is referred to the Second Edition (1962) of the Silicon Controlled Rectifier Manual by F. W. Gutzwiller et al., published by the General Electric Company, Rectifier Components Department, Auburn, N.Y.

The present invention is especially concerned with controlled-rectifier inverter circuits in which a special nonlinear two-core transformer provides the characteristics necessary for periodically turning off the controlled rectifiers. Commutation, in the normal sense of a transference of conduction from one controlled rectifier to another, does not occur. Instead, the turning off of a controlled rectifier is accomplished by means of a two-core transformer in a manner which is entirely independent of the turning on of any other controlled rectifier. Consequently, the circuit is free from many of the difficulties normally associated with commutation in parallel inverters.

It is an object of the invention to provide improved circuitry for converting direct current to alternating current with inverter circuitry in which controlled rectifiers are used as the switching elements.

A further object of the invention is to provide, in an inverter using a plurality of controlled rectifiers, means for cyclically turning off each controlled rectifier in a manner which does not depend on the turning on of any other controlled rectifier or on the action of any auxiliary switching element.

A still further object of the invention is to provide an inverter of minimum weight and size for a given frequency and power capacity.

Another object is to provide an inverter exhibiting improved utilization of the flux capacity of the magnetic elements of the inverter.

Another object of the invention is to provide a controlled-rectifier inverter circuit which does not require an inductor in series with the direct current source or in series with a controlled rectifier, thereby providing an inverter with a very low transient impedance.

Another object of the invention is to provide an inverter in which the average voltage during each half cycle of the inverter output is a constant despite possible variations in the magnitude of the D.C. input voltage to the inverter.

A still further object of the invention is to provide means for converting direct current to alternating current with a very high efficiency.

Various other objects and advantages will appear from the following description of the invention and from the drawings.

This invention follows the prior art insofar as it uses two or more controlled rectifiers as switching elements such that a voltage derived from a direct-current source can be switched across primary winding means of a transformer in such a manner that the flux movement within the transformer is caused to alternate in direction and thereby to induce an alternating voltage in a load winding. The primary winding means may consist, for example, of two windings of opposite polarity which are alternately connected across a D.C. voltage source by the switching action of the controlled rectifiers. In many instances, however, the primary winding means consists of a single winding across which a voltage of alternating polarity is impressed through the switching action of the controlled rectifiers. Such techniques have been widely used in the prior art to make possible inversion or the generation of alternating current from a direct current source. Persons skilled in the art will be familiar with the so-called parallel inverter configuration and also the variety of so-called bridge and split-neutral inverter configurations. This invention involves the combination of special elements with any of these fundamental configurations to provide the characteristics necessary to turn off the controlled rectifier switching elements. Although in the following technical description of the invention the parallel-inverter configuration has been selected for illustrational purposes and has therefore received special emphasis, this should not be construed to imply any limiting of the invention to this configuration.

A principal element of this invention is a nonlinear transformer having two magnetic paths. The first of these magnetic paths is chosen so as to exhibit highly rectangular hysteresis-loop characteristics, and might be provided, for example, by a tape-wound toroidal core made from a nickel-iron alloy such as are commercially available at the present time. This first magnetic path or core serves as the main power-handling core of the inverter, i.e. this core serves as the main magnetic path for the inductive coupling which exists between the primary and load windings of the inverter. The second magnetic path is provided by a core which is much smaller in physical size than the first core and this second magnetic path normally comes into play only during very brief intervals of each cycle of the operation of the inverter.

Figure 1:
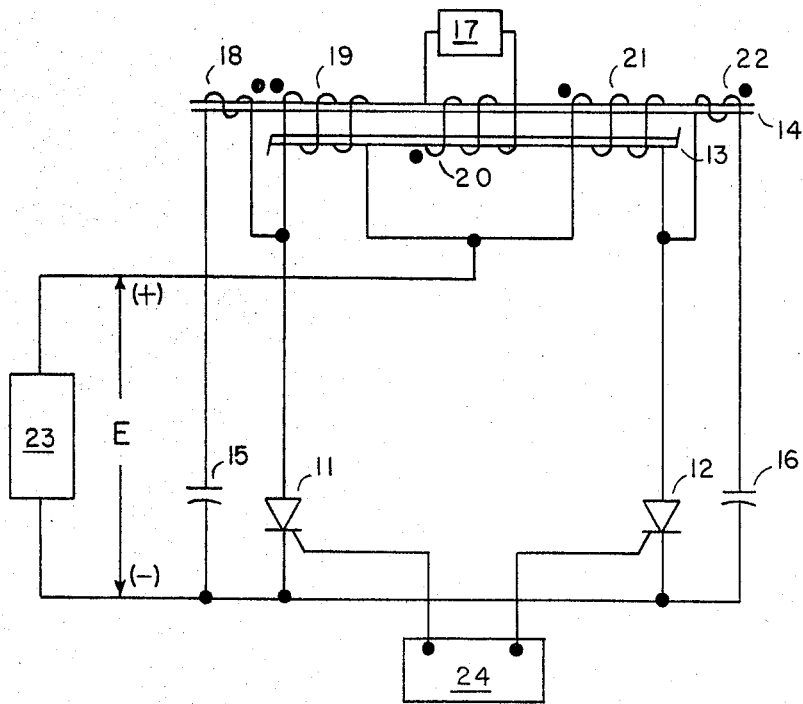
FIGURE 1 is a diagram of a circuit embodying one form of the invention.

In FIGURE 1 there is shown one embodiment of the invention. This circuit is of the so-called parallel inverter configuration and is capable of converting the direct current provided by the D.C. source 23 to alternating current which is supplied to the load 17. Controlled rectifiers 11 and 12 are used as the necessary switching elements. A primary difference between this circuit and prior-art circuits relates to the highly efficient, convenient, and reliable manner in which the two controlled rectifiers 11 and 12 are cyclically returned to the nonconducting state. The manner in which this circuit converts direct current to alternating current and the manner in which the nonlinear action of the two magnetic paths or cores 13 and 14 causes the two controlled rectifiers 11 and 12 to be turned off at the desired moments in the cyclic operation of the circuit are explained in the following paragraphs.

Referring now to FIGURE 1 of the drawing there is provided a direct-current source of electrical energy 23, two controlled rectifiers 11 and 12, a triggering circuit 24 to provide pulses for turning on controlled rectifiers 11 and 12, two magnetic paths or transformer cores 13 and 14, a load 17, two capacitors 15 and 16, and windings 18, 19, 20, 21 and 22.

Dots are used in FIGURE 1 to indicate winding polarities relative to one another, i.e. a flux change within a given winding which tends to make the dotted end of that winding positive with respect to the undotted end of that winding will induce voltages of like sign in any other windings within which the same flux change also occurs.

The undotted end of winding 19 is connected to the positive terminal of the direct-current source 23 whereas it is the dotted end of winding 21 that is so connected. The anode terminals of controlled rectifiers 11 and 12 are connected to the other terminals of windings 19 and 21. The cathode terminals of controlled rectifiers 11 and 12 are connected to the negative terminal of the direct-current source 23. Windings 19, 20, and 21 each encircle both transformer core 13 and transformer core 14 whereas windings 18 and 22 encircle only core 14. Once the invention has been fully understood, it will become apparent that winding configurations other than that shown in FIGURE 1 may employ the invention. The two terminals of winding 20 are connected to whatever device or circuit is to be supplied with energy from the inverter. Auxiliary winding 18 is connected in series with capacitor 15 and this series connection of winding 18 and capacitor 15 is connected so as to form an electrical path in parallel with the anode-to-cathode path of controlled rectifier 11. Auxiliary winding 22 is connected in series with capacitor 16 and this series circuit is similarly connected so as to form an electrical path in parallel with the anode-to-cathode path of controlled rectifier 12. The triggering circuit 24 is connected to the gate electrodes of controlled rectifiers 11 and 12.

Normally the number of turns in windings 19 and 21 are made equal and the number of turns in windings 18 and 22 are also made equal. It is essential that the number of turns in winding 18 be less than the number of turns in winding 19 and that the number of turns in winding 22 be less than the number of turns in winding 21.

When controlled rectifier 11 is made conducting, the voltage E of the D.C. source 23 is impressed across primary winding 19, and a voltage of predetermined polarity is thereby induced in the load winding 20. Similarly, if controlled rectifier 11 is made non-conducting and conduction is instead initiated in controlled rectifier 12, the voltage of the D.C. source 23 will be impressed across winding 21 and the polarity of the voltage induced in winding 20 will be reversed. If controlled rectifiers 11 and 12 are made to conduct alternately, with 11 being non-conducting as 12 conducts and vice-versa, it is clear that an alternating voltage will be induced in the load winding 20.

Figure 2:
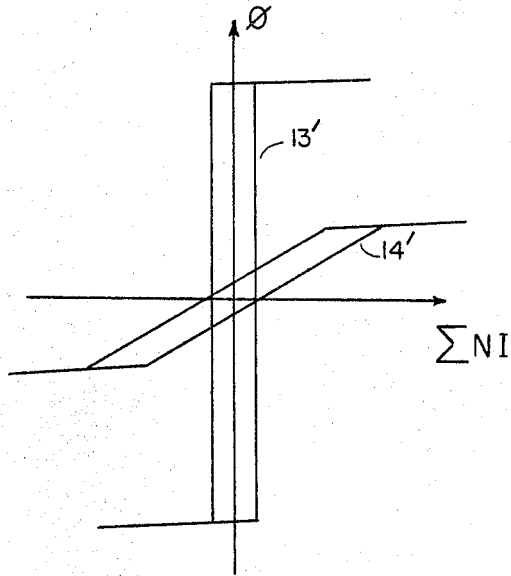
FIGURE 2 is a diagram of forms of hysteresis-loop characteristics suitable for the two cores employed in the circuit of FIGURE 1.

Consider now the manner in which the nonlinear characteristics of the two transformer cores 13 and 14 are used in this embodiment of the invention to cause each controlled rectifier to be turned off after the desired conduction interval. Typical magnetic characteristics for the two transformer cores are shown in FIGURE 2 in which 13' represents the magnetic characteristic of core 13 and 14' represents the magnetic characteristic of core 14. It is seen that the two cores 13, 14 are selected so as to display quite different flux ($\phi$) versus magnetomotive-force (M.M.F.) characteristics 13', 14'. Core 13 has a highly square $\phi$ versus M.M.F. characteristic 13', and has a very high value of remanence flux, i.e., has characteristics which will allow a very high value of flux to exist in the presence of zero M.M.F. The characteristic 14' of core 14, on the other hand, is not necessarily highly square, and is selected so as to have a relatively low value of remanence flux. Cores providing magnetic paths with these general characteristics are readily available.

For this discussion it will be assumed that a suitable triggering circuit 24 is employed in order to provide pulses, at a controllable rate, of positive current alternately to the controlled rectifier gates. Many circuits suitable for this purpose are to be found in the literature, as for example in the 1962 Silicon Controlled Rectifier Manual by F. W. Gutzwiller et al., published by the General Electric Company, Rectifier Components Department, Auburn, N.Y. Because the present invention does not depend on the use of any one particular trigger circuit and because many suitable triggering circuits are described in the literature, the details of the triggering circuit will be excluded from consideration in the description of this invention.

The functioning of the inverter may best be outlined by following its operation through one complete cycle of events. For convenience, the direction of flux movement which occurs when controlled rectifier 11 is turned on and the input voltage E is impressed across winding 19 will be termed "flux movement to the right." Similarly, the opposite direction of flux movement will be termed "flux movement to the left."

Assume that just prior to the arrival of a triggering pulse at the gate of controlled rectifier 11, neither controlled rectifier is conducting and core 13 is saturated to the left. When the triggering pulse turns on controlled rectifier 11, the voltage at its anode terminal drops to approximately zero volts, whereas, by auto-transformer action, the voltage at the anode of controlled rectifier 12 rises to a value of approximately twice the input voltage E. Capacitor 15 discharges through winding 18 and the conducting controlled rectifier 11 until its voltage becomes equal to the low forward voltage drop of controlled rectifier 11. Similarly, capacitor 16 charges through winding 22 until its voltage corresponds to the approximately 2E volts appearing at the anode of controlled rectifier 12. The flux in core 13 moves to the right because of the voltage impressed across winding 19, and a proportional voltage is induced in the load winding 20.

The currents flowing in windings 19 and 20, which encircle both cores, cause the same M.M.F. to be applied to both cores 13 and 14. However, because of the relative M.M.F. requirements of the two cores, so long as core 13 remains unsaturated, no flux change occurs in core 14. Thus, for the interval of time which is required for the flux in core 13 to move from saturation to the left to saturation to the right, no voltages will be induced in windings 18 and 22. This interval, during which core 13 is unsaturated, is the conducting internal of controlled rectifier 11. When core 13 saturates, the flux in core 14 abruptly begins to change and voltages will be induced in windings 18 and 22. This flux change in core 14 will also be to the right and the voltage which abruptly appears in winding 18 will be of such polarity as to tend to impress a reverse voltage across the anode-cathode path of controlled rectifier 11. At the moment core 13 saturates, the voltage across capacitor 15 is approximately zero, and therefore the voltage suddenly induced in winding 18 does actually cause a reverse voltage to be applied across controlled rectifier 11. This reverse voltage is transient in nature for, as the voltage of capacitor 15 rapidly increases, the magnitude of the reverse voltage appearing across the controlled rectifier 11 decreases until the controlled rectifier 11 is again subjected to a forward voltage such that its anode is positive with respect to its cathode. During the transient interval it is subject to a reverse voltage the controlled rectifier 11 regains its forward-blocking ability.

Controlled rectifier 11 having thus been turned off by the action of the nonlinear two-core transformer comprising cores 13 and 14, both controlled rectifiers remain nonconducting until the next pulse from the triggering circuit 24 turns on controlled rectifier 12. Then a sequence of events similar to that which has just been described takes place with the result that controlled rectifier 12 conducts for the length of time required for the flux in core 13 to move from saturation to the right to saturation to the left and is then turned off by the action of the nonlinear transformer and capacitor 16. Thus, there exists an interval during each half cycle during which neither controlled rectifier is conducting, and an output voltage of alternating polarity is induced in winding 20.

By using the nonlinear characteristics of the two magnetic paths 13, 14 in the manner just explained, it is seen that the turning off of one of the controlled rectifiers is accomplished quite independently of the turning on of the other. The length of the individual conducting intervals of the controlled rectifiers of the inverter is determined by the length of time required for the flux in the square loop core 13 to change from one saturation level to the other under the influence of the D.C. input voltage as applied to one of the primary windings 19 or 21. Thus, there will ordinarily be an interval at the end of each half cycle during which neither controlled rectifier conducts, i.e., an interval between the moment one controlled rectifier is turned off by the nonlinear action of the two magnetic paths and the moment at which the other controlled rectifier is turned on by a triggering pulse from whatever triggering circuit is used. Thus, in this embodiment of the invention, it is the action of the nonlinear magnetic transformer which determines the length of the conducting intervals of the controlled rectifiers, but it is the frequency of the external triggering circuit which determines the frequency of the inverter.

In connection with the foregoing facts, it is significant to note that the integral of the voltage-time product of the output waveform of the inverter taken over any half cycle will always have a constant value despite possible variations in the magnitude of the input voltage to the circuit. This occurs because it is the cyclic saturation of core 13 which controls the length of time the controlled rectifiers conduct, and the rate of flux change in this core is directly proportional to the magnitude of the D.C. input voltage applied to the primary windings. Thus, an increase in the magnitude of the D.C. input voltage to the inverter causes a proportional increase in the instantaneous output voltage during the interval a controlled rectifier is conducting, but the corresponding increase in the rate of flux change within core 13 causes this core to saturate more quickly and thereby decreases the length of the conducting interval. A practical significance of this behavior is that in such inverters operated at a constant frequency the average output voltage per half cycle of the inverter is independent of the input voltage to the inverter and is, in fact, constant. In many applications of inverters the inverter output is rectified and filtered in order to obtain a D.C. output at some desired voltage level. In FIGURE 1 such functions may be considered as being performed in block 17, i.e., the rectifier, if any, and the filter, if any, can be considered to be a part of the load device. In such applications the constant average output voltage of this inverter makes possible an open-loop type of regulation of the output voltage against variations in the input voltage. It is only necessary that the frequency of the triggering pulses be kept constant and that any filtering be performed by an averaging type of filter.

Conversely, the average output voltage per half cycle, which is proportional to the frequency of the triggering circuit, may be intentionally varied by varying the frequency of the triggering pulses. A variable frequency triggering circuit is therefore desirable, in some instances.

It has been seen that a fundamental consideration in this invention is the establishment of certain conditions of relative flux movement within two individual magnetic paths, i.e., conditions such that so long as the first of the two paths is not saturated, no flux movement will occur in the second path, but such that when the first path saturates the flux in the second path will abruptly begin to change. This abrupt transition of the occurrence of flux movement from one magnetic path to the other provides the basis of the means by which a conducting controlled rectifier is turned off. In the embodiment of the invention just discussed, the necessary conditions of relative flux movement were brought about by selecting two transformer cores with appropriately differing magnetic characteristics. Thus, if the magnetic characteristics are related in the manner suggested by FIGURE 2, it is seen that if both cores are subjected to the same M.M.F. the square-loop core must become saturated in order for the flux excursion in the lower remanence core to become signficant.

Though the selection of appropriate relative magnetic characteristics for the two cores has been suggested as one means for establishing the necessary sequence of flux movements within the two magnetic paths, it should not be inferred that this is the only means for establishing these conditions. It is the establishment of these conditions of relative flux movement that is fundamental to the invention rather than the particular method by which they are established. In particular, it should be recognized that it is possible to use two cores both of which have substantially square hysteresis loops and to apply a small additional M.M.F. to the second core in such a direction and of such magnitude as to insure that its flux does not begin to change until the first core becomes saturated. Such an M.M.F. can be applied to the second core by causing a current of proper direction to be passed through a winding which encircles only the second core. For example, the voltage of a load winding of the inverter may be applied to a series combination of a resistor and a winding placed on the second core such that the current in this winding applies an M.M.F. to the second core which opposes the M.M.F. from the primary windings of the inverter with the result that the net M.M.F. applied to the second core is made significantly less than that applied to the first core. This method of insuring the desired conditions of relative flux movements within two such magnetic paths along with several alternative methods has been described in greater detail in patent application S.N. 249,110 to which reference has previously been made. Thus, it is the establishment of conditions such that only after the first magnetic path becomes saturated does significant flux movement begin to occur in the second magnetic path that is fundamental to the invention. As mentioned above, any of several means may be used to insure the existence of these conditions.

In the parallel inverter configuration just discussed, it should be noted that the primary windings of the inverter and the load winding of the inverter encircle both of the magnetic paths of the special nonlinear transformer. It can also be seen that for each controlled rectifier there is provided an auxiliary winding encircling only the second magnetic path and that these auxiliary windings each contain a lesser number of turns than the primary windings. Each auxiliary winding is connected in series with a capacitor and each such series circuit consisting of a capacitor and auxiliary winding is then connected in parallel with the anode-cathode path of a controlled rectifier. By connecting the auxiliary windings into the circuit in this manner and with the proper polarities, it is seen that at the moment the first magnetic path becomes saturated a voltage is induced in the auxiliary windings such that the conducting controlled rectifier is turned off. By following these same general directions, the principles of this invention can be adapted to a great variety of inverter configurations including bridge configurations split-neutral configurations and the like.

What is claimed is:

1. In an electrical inverter system, a source of unidirectional input voltage; a plurality of controlled rectifiers; a nonlinear transformer having first and second magnetic paths of predetermined hysteresis-loop characteristics; means for cyclically switching on and off the controlled rectifiers so as to cyclically connect said source of unidirectional input voltage across the primary side of said nonlinear transformer whereby to cause the direction of flux movement within said transformer to alternate; means for turning off each conducting rectifier after a predetermined interval of conduction such that during any half cycle any conducting controlled rectifier is returned to the nonconducting state without dependence upon the turning on of any other controlled rectifier, said means for turning off the controlled rectifiers making use of said first and second magnetic paths within said nonlinear transformer; primary winding means encircling both of said magnetic paths and load winding means encircling both of said magnetic paths such that both currents flowing in said primary winding means and currents flowing in said load winding means apply a magnetomotive force to each of said paths whereby during each half cycle a flux change is caused to occur, said flux change occurring predominately in said first magnetic path until said first path becomes saturated and thereafter occurring predominately in said second magnetic path; auxiliary winding means equal in number to the number of controlled rectifiers and one such auxiliary winding means being associated with each controlled rectifier, said auxiliary winding means encircling only said second path; a capacitor connected in series circuit with each said auxiliary winding means and one such series circuit being used with each controlled rectifier to form an electrical path in parallel with the anode-cathode path of the controlled rectifier, said series circuits being arranged and operative to transiently apply a negative turn-off voltage across any controlled rectifier which is in the conducting state at the beginning of said second path flux change whereby such conducting controlled rectifier will be returned to the nonconducting state; said inverter system being operative to accept electrical energy from a direct-voltage source and to supply electrical energy from said load winding in the form of alternating current and voltage at a frequency which may be predetermined by the cyclic rate at which the controlled rectifiers of the inverter are turned on and off.

2. In an electrical inverter system as claimed in claim 1 in which said hysteresis-loop characteristics comprise a square loop characteristic for said first path and a low-remanence characteristic for said second path.

3. In an electrical inverter system as claimed in claim 1 having means to rectify the electric currents from said output terminals so as to provide a direct-current output.

4. In an electrical inverter system as claimed in claim 1 in which said triggering means are adapted to turn on said controlled rectifiers alternately at a constant cyclic rate so that a constant average voltage per half cycle may be derived from said output terminals.

5. In an electrical inverter system as claimed in claim 1 in which said triggering means is effective to vary the cyclic rate at which the controlled rectifiers are turned on so as to control the average output voltage per half cycle obtained from said output terminals.

6. In an electrical inverter system, a source of unidirectional input voltage; first and second controlled unidirectional conducting devices having control gate electrodes; triggering means for said gating electrodes operative to render said devices alternately conducting; magnetic core means establishing first and second magnetic paths of predetermined hysteresis-loop characteristics; first winding means encircling both of said paths and energized by said source when either of said devices is conducting and operative to apply magneto motive forces of predetermined values to each of said paths such that when said first device is conducting a flux change is caused to occur predominately in the first path in a first direction followed by a flux change in the same first direction predominately in the second path and when said second device is conducting a flux change is caused to occur predominately in the first path in a second direction opposite to said first direction followed by a flux change predominately in the second path in said second direction; second and third winding means encircling only said second path; first and second capacitors, said first capacitor being connected in a first series circuit with said second winding means and said first series circuit forming a shunt path around said first device and said second capacitor being connected in a second series circuit with said third winding means and said second series circuit forming a shunt path around said second device, said first capacitor and second winding means being arranged and operative to apply a negative turn-off voltage across said first device when under the influence of said second-path flux change in said first direction, and said second capacitor and third winding means being arranged and operative to apply a negative turn-off voltage across said second device when under the influence of said second-path flux change in said second direction, and said capacitors being operative to block flow of current in their respective shunt paths when the respective device with which each capacitor is in series is nonconducting; and a pair of output terminals energizable when either of said devices is conducting and operative to produce an alternating voltage therebetween.

7. In an electrical inverter systems as claimed in claim 6 in which said first winding means is divided into two parts and only one of said parts is energized by said source when either of said devices is conducting.

8. In an electrical inverter system as claimed in claim 6 in which said hysteresis-loop characteristics comprise a square loop characteristic for said first path and a low remanence characteristic for said second path.

9. In an electrical inverter system as claimed in claim 6 including a load winding encircling both of said paths and connected to said output terminals.

10. In an electrical inverter system as claimed in claim 6 including rectifying means connected to said output terminals and operative to provide a direct-current voltage output at said output terminals.

11. In an electrical inverter system as claimed in claim 6 in which said triggering means are adapted to turn on said controlled rectifiers alternately at a constant cyclic rate so that a constant average voltage per half cycle may be derived from said output terminals.

12. In an electrical inverter system as claimed in claim 6 in which said triggering means is effective to vary the cyclic rate at which the controlled rectifiers are turned on so as to control the average output voltage per half cycle obtained from said output terminals.

No references cited.

JOHN F. COUCH, *Primary Examiner.*

W. SHOOP, *Assistant Examiner.*